Dec. 3, 1968  B. D. BEDFORD ETAL  3,414,698
HIGH VOLTAGE TRANSFORMER TYPE HEATER FOR HEATING FLUIDS

Filed Oct. 27, 1965  2 Sheets-Sheet 1

Inventors,
Burnice D. Bedford,
George W. Kessler,
by Gilbert P. Tarlton
Their Attorney.

Inventors,
Burnice D. Bedford,
George W. Kessler,
by Gilbert P. Tarleton
Their Attorney.

United States Patent Office 3,414,698
Patented Dec. 3, 1968

3,414,698
HIGH VOLTAGE TRANSFORMER TYPE HEATER
FOR HEATING FLUIDS
Burnice D. Bedford, Scotia, and George W. Kessler, Schenectady, N.Y., assignors to General Electric Company, a corporation of New York
Filed Oct. 27, 1965, Ser. No. 505,351
13 Claims. (Cl. 219—10.51)

ABSTRACT OF THE DISCLOSURE

A fluid heater comprising a high voltage transformer primary winding that is wound around a fluid conducting coil of pipe that acts as a substantially short-circuited transformer secondary winding. Means are provided to pass fluid through the coil of pipe in heat exchange relationship therewith so the fluid absorbs a major portion of the heat generated by the inherently inefficient transformer action of the invention.

---

This invention relates to electric heating of fluids and more particularly to electric water heaters for swimming pools.

The problem to which this invention is particularly directed is the production of a low cost and safe electric heater for swimming pools. Such a heater must heat a large volume of water to a moderate temperature compared to say a domestic hot water supply heater or a boiler for hot water house heating where much less water is heated to a much higher temperature. The overall energy values may, however, be quite comparable.

By a direct transformer heater is meant a transformer with a high voltage primary winding and an iron pipe which functions as the magnetic core, the secondary winding, the heater and the heat transfer surface to the fluid to be heated. By high voltage is meant a voltage at least as high as typical commercial frequency primary distribution voltage (several thousand volts) as compared to the usual secondary distribution voltage (a few hundred volts).

Such a direct transformer heater is less costly than say an indirect transformer heater where a separate transformer supplies heating current to a heater as, for example, in frozen water pipe thawing where a welding type transformer has its secondary winding connected to spaced points on a water pipe between which points low voltage heavy heating current flows. It is also much less costly than high frequency induction or dielectric heaters. It is safer than direct electrical heating by passing a high voltage heating current directly through the water or by immersing high voltage electrical resistance heaters directly in the water. Converting a direct heater to an indirect transformer heater by adding or using a separate voltage step-down transformer will solve the safety problem, but greatly increase the cost. Converting a direct heater to a semi-direct heater by interposing an electrical insulating heat exchanger loop will solve the safety problem, but will also substantially increase the cost and size of the heater.

While the direct transformer heater which comprises the present invention is particularly adapted to swimming pool water heaters it should, of course, be understood that it is not limited to such use or even to heating liquids and that it is capable of general application to electric heating of fluids.

An object of the invention is to provide a new and improved electric heater for fluids.

Another object of the invention is to provide a direct transformer heater for fluids.

A further object of the invention is to provide a new and improved water heater for swimming pools.

An additional object of the invention is to provide a unitary safe high voltage input electric water heater.

The invention will be better understood from the following description taken in connection with the accompanying drawings and its scope will be pointed out in the appended claims.

Figure 1:
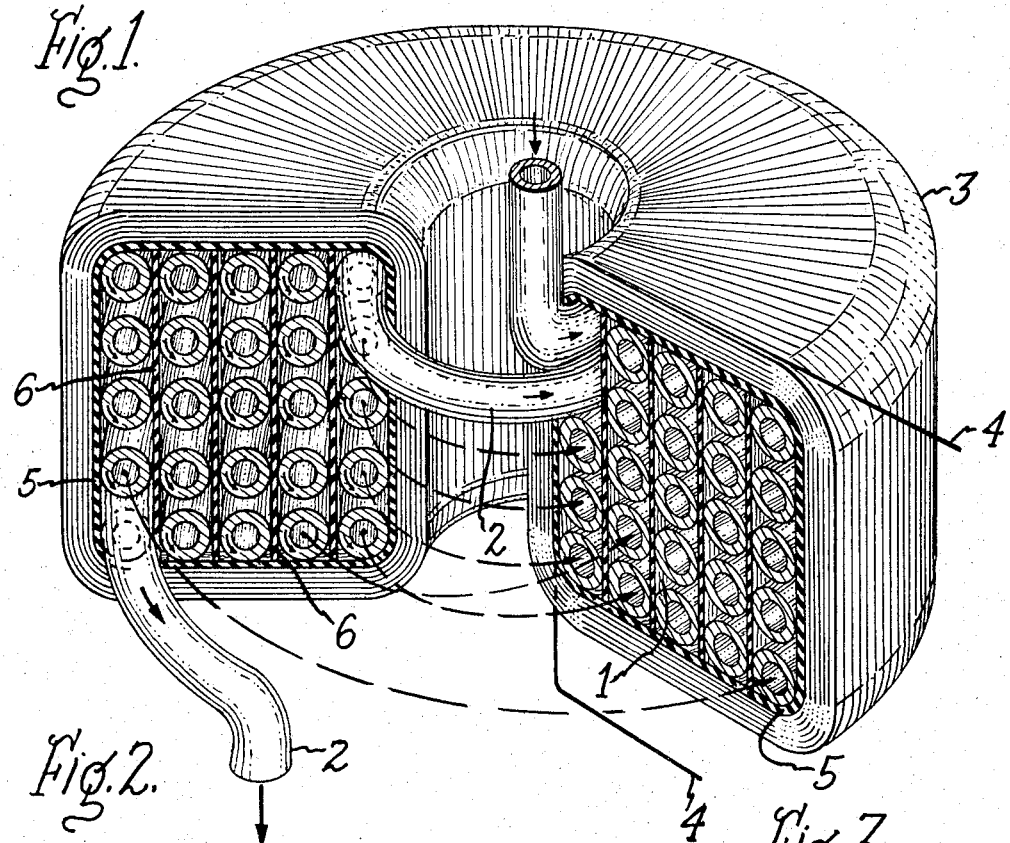
Figure 2:
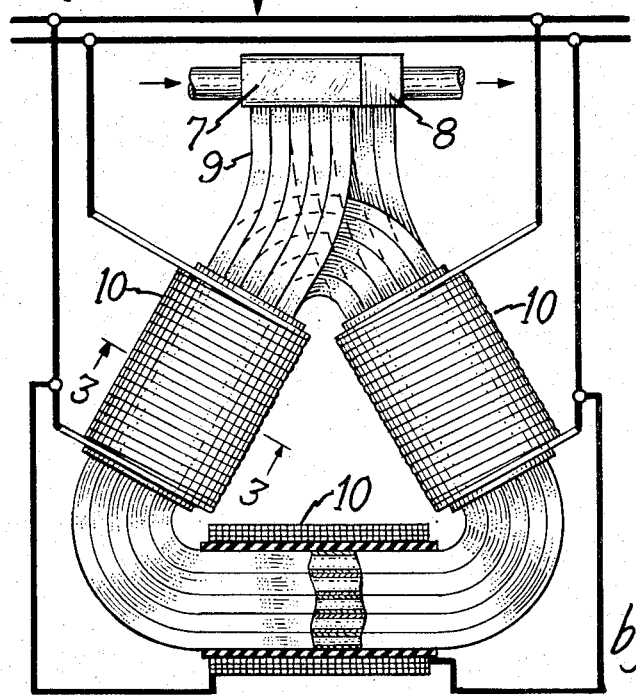
Figure 3:
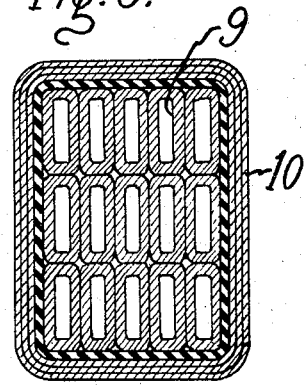
Figure 4:
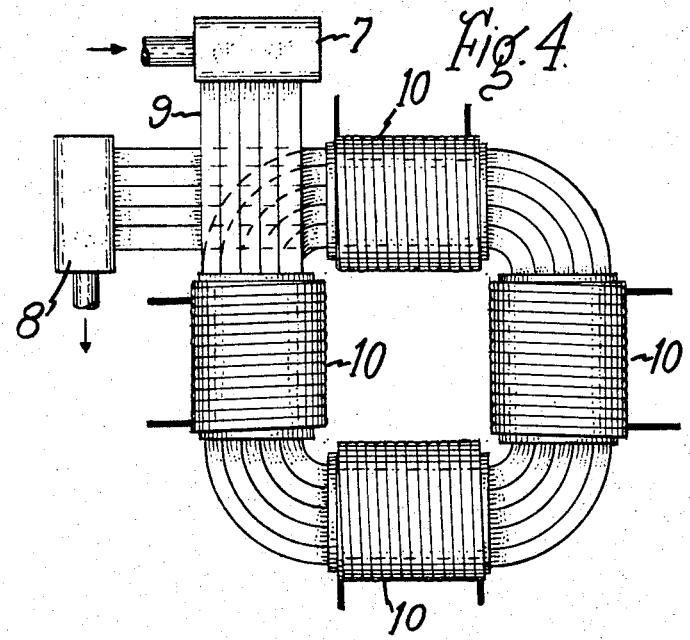
Figure 6:
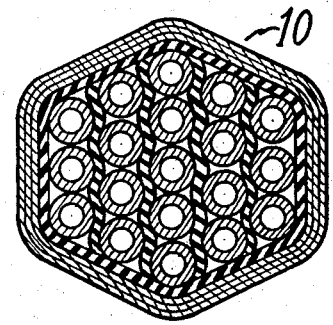
Figure 5:
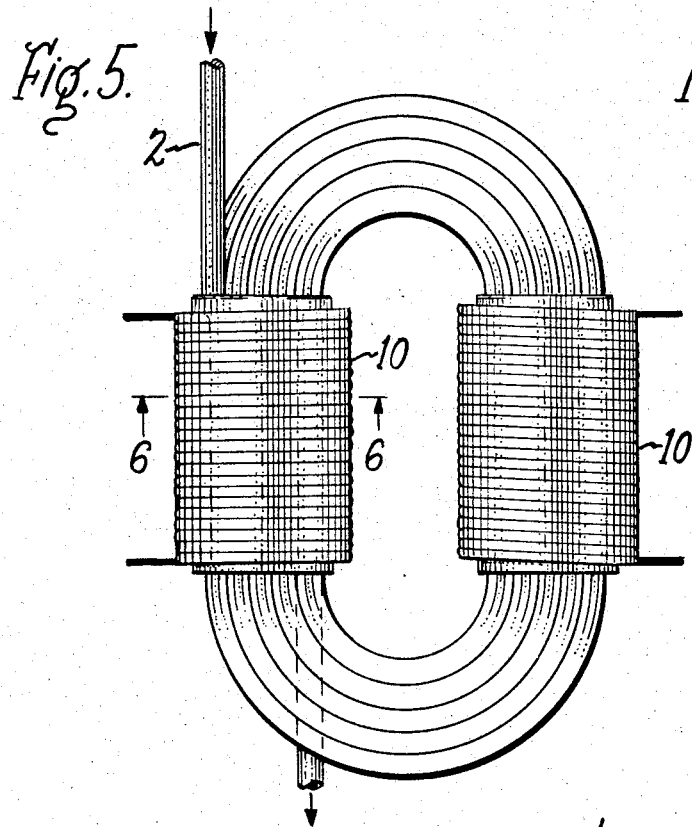
Figure 7:
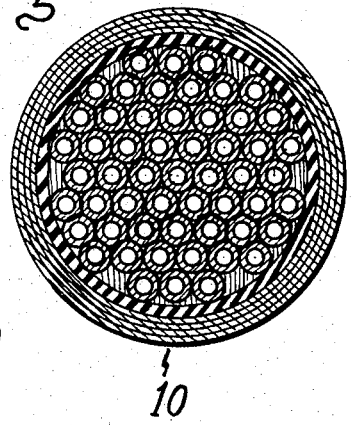

In the drawings,
FIG. 1 is a broken away perspective view partly in section of an embodiment of the invention,
FIG. 2 is a plan view partly broken away and in section of a modification,
FIG. 3 is a sectional view taken on line 3—3 of FIG. 2,
FIGS. 4 and 5 illustrate further modifications,
FIG. 6 is a sectional view taken on line 6—6 of FIG. 5 and
FIG. 7 is a modified sectional view similar to FIG. 6.

Referring now to the drawings and more particularly to FIG. 1, the direct transformer heater comprises a helical coil 1 of pipe 2 enclosed in a toroidal winding 3 of electrical conductor 4. Helical coil 1 is shown as consisting of five layers of five turns all being in series. The pipe 2 is preferably made of lossy magnetic material having substantial electrical resistance. Suitable material is ordinary iron water pipe such as standard one inch pipe. The toroidal winding 3 preferably comprises a number of layers of insulated relatively low resistance electric wire such as copper or aluminum wire. Preferably it has a comparatively high voltage rating, i.e. it has sufficient turns so that it can be connected directly across a primary distribution feeder of say 4000 volts or 6900 volts. It is, of course, insulated from the coil 1 by suitable electrical insulation 5. Although not essential, as is explained below, electrical insulating barriers 6 separate certain sets of turns of the pipe 2.

In operation, when the toroidal coil 3 is energized its magnetic flux induces circumferential circulating currents in the pipe as indicated by the curved arrows on their cross section. Furthermore, the iron pipe may have a hysteresis loop with a relatively large cross sectional area compared with that of electrical grade transformer core steel so that it has a comparatively high hysteresis loss. The combination of the currents circulating circumferentially in the comparatively high resistance material of the pipe and the magnetic loss therein produces heat which is transferred directly to any fluid such as water filling the pipe 2.

The construction is such that practically no voltage is induced in the coil of pipe between its inlet and outlet ends both of which may be and usually will be solidly grounded.

In effect, each elemental cross section of the pipe is a short circuited turn for a part of the magnetic flux. By electrically bonding or brazing the adjacent pipes together so as to make good electrical connection therebetween, there would effectively be produced a much larger short circuited turn for the flux and more efficient heating. However, this is difficult to do and if there is not good sidewise contact throughout the length of the turns of the pipe there can be localized hot spots which would be objectionable. Accordingly, the barriers 6 are inserted for breaking up the larger short circuited turn effect.

The losses in the toroidal primary winding 3 also contribute to heating the fluid in the pipe 2 or conversely the fluid serves to cool the primary winding 3.

With this construction, it should be noted that the pipe 2 serves as the magnetic core for the transformer, its secondary winding (in which the secondary current is a circumferentially circulating short circuit turn current), the heater for the fluid in the pipe and the heat transfer surface to that fluid. While the device is highly inefficient as a transformer, this is exactly what is desired because the lower the efficiency the greater the losses and hence the greater the amount of heat which is transferred to the fluid to be heated; in other words, the more efficient the device is as an electric heater.

The wound iron pipe construction with many turns makes a good magnetic circuit in that relatively little m.m.f. is used to force flux through air. This is true because only a small portion of the total flux is required to take the air path between the end regions of the pipe turns. Most of the flux takes the spiral iron path provided by the pipe. The inlet and outlet portions of the pipe can be arranged to be near each other or may be joined together magnetically to minimize the air flux path. This good core construction makes the complete transformer-heater operate with high power factor.

In the modification shown in FIGS. 2 and 3, the helical coil of pipe has a triangular configuration rather than a circular configuration as in FIG. 1. Furthermore, pipe turns are connected in series-parallel rather than in series as in FIG. 1. Thus an inlet header 7 and an outlet header 8 join the opposite ends of five flattened pipes 9 which are wound to provide three layers or turns. The straight legs of the triangular coil of pipe carry cylindrical electrical windings 10 which are somewhat easier to form and insulate than a toroidal one. By flattening the pipe as shown to have an oval or rectangular cross section, it is easier to coil or bend the pipe. As shown, the three windings 10 are connected in parallel but they can of course also be connected in series. The flattening of the pipes 9 also provides more efficient heating as the ratio of iron area to the enclosed area is increased.

FIG. 4 is generally similar to FIG. 2 except that the coil of pipe has a square rather than a circular or triangular configuration, there being five pipes 9 joined at their ends by inlet and outlet headers 7 and 8 and four helical electrical windings 10 surrounding the four straight legs of the coil of pipe.

In the modification shown in FIG. 5, a round pipe 2 as in FIG. 1 may be helically coiled into an elliptical rather than a circular cylindrical configuration so as to provide long legs on which electrical windings 10 may be placed. The cross sectional configuration of the pipe coil instead of being rectangular as in FIGS. 1, 3 and 4 may be hexagonal as in FIG. 6, which is a view taken on line 6—6 of FIG. 5. However, it may also be circular as shown in FIG. 7. As between FIGS. 6 and 7 the former provides somewhat more efficient surface cooling of the electrical coils 10.

The direct transformer heater is easily designed for different fluid heating applications. The primary turns and core cross section are easily designed to match the voltage and power requirements of different applications. The power may be controlled by taps on the primary winding or voltage control equipment such as tap changers, induction regulator, phase controlled semiconductors or time ratio control circuits.

Pipe thickness, pipe material, pipe diameter and parallel fluid circuits are other design factors which can be controlled to match a combined transformer fluid heater to a particular application. A non-conducting liner or a conducting liner like a copper liner inside the iron pipes will have little effect on the secondary current when the individual pipe turns are separated by insulating material. However, an inner copper liner may be used to prevent corrosion. A copper liner on the outside of each iron pipe will conduct current and increase the power handled by a given section of pipe.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. An inductive high voltage input electrical resistance heater for fluids comprising, in combination, a length of electrical conducting pipe in the form of an at least one turn coil, and an electrical winding linking said coil of pipe for sending an alternating mangetic flux therethrough which induces circumferentially circulating heating currents in the wall thereof perpendicular to the length thereof.

2. An inductive high voltage input electrical resistance heater for fluids comprising, in combination, a length of electrical conducting pipe in the form of a multi-turn coil, and an electrical winding linking said multi-turn coil of pipe for sending an alternating magnetic flux therethrough whereby any transverse cross section of said length of pipe constitutes an elemental short circuited conductive turn linking at least some of said flux and has induced therein circumferentially circulating heating currents.

3. A heater as in claim 2 in which said length of pipe is in the form of a cylindrical helix and said winding is in the form of a toroidal helix.

4. A heater as in claim 1 in which said pipe has a magnetic permeability substantially greater than air so that it comprises a substantially closed magnetic core for said winding.

5. A heater as in claim 1 in which said pipe has a magnetic permeability substantially greater than air and a hysteresis loop having a relatively large area.

6. A heater as in claim 1 in which said pipe comprises iron.

7. A heater as in claim 1 in which said pipe comprises iron and has a conductive liner.

8. A heater as in claim 1 in which said pipe comprises iron and has a copper liner.

9. An inductive high voltage input electrical resistance heater for fluids comprising, in combination, a multiturn helical coil of uninsulated electrical conducting pipe, and a toroidal winding of insulated electrical conductor enclosing said coil of pipe whereby a magnetic flux produced by alternating current flow in the toroidal winding will induce circumferentially circulating heating currents in the cross section of said pipe and will not induce a voltage difference between spaced points along the length of said pipe.

10. A heater as in claim 1 in which said pipe coil has at least one straight leg and said winding is cylindrical and surrounds said leg.

11. A heater as in claim 1 in which said pipe has a noncircular cross section.

12. A heater as in claim 1 in which said pipe has a rectangular cross section.

13. A heater as in claim 9 in which said pipe has a rectangular cross section of long and short sides with the long sides parallel to the axis of the pipe coil.

References Cited

UNITED STATES PATENTS

| 1,260,564 | 11/1918 | Magnusson et al. | 219—10.51 |
| 2,181,274 | 11/1939 | Jackson et al. | 219—10.49 X |
| 2,302,774 | 11/1942 | Jarvis | 219—10.51 |

FOREIGN PATENTS

| 222,120 | 6/1942 | Switzerland. |
| 504,880 | 5/1939 | Great Britain. |

RICHARD M. WOOD, *Primary Examiner.*

L. H. BENDER, *Assistant Examiner.*